June 15, 1926.

E. H. FOLEY 1,589,139

COMBINED MOTION PICTURE AND SOUND RECORDING AND REPRODUCING APPARATUS

Filed April 4, 1924    3 Sheets-Sheet 1

INVENTOR
Earl H. Foley
BY
Pierre Barnes
ATTORNEY

June 15, 1926.  
E. H. FOLEY  
1,589,139

COMBINED MOTION PICTURE AND SOUND RECORDING AND REPRODUCING APPARATUS

Filed April 4 1924     3 Sheets-Sheet 2

INVENTOR  
Earl H. Foley  
BY  
Pierre Barnes  
ATTORNEY

June 15, 1926.

E. H. FOLEY 1,589,139

COMBINED MOTION PICTURE AND SOUND RECORDING AND REPRODUCING APPARATUS

Filed April 4, 1924

3 Sheets-Sheet 3

INVENTOR
Earl H. Foley
BY
ATTORNEY

Patented June 15, 1926.

1,589,139

UNITED STATES PATENT OFFICE.

EARL H. FOLEY, OF SEATTLE, WASHINGTON.

COMBINED MOTION-PICTURE AND SOUND RECORDING AND REPRODUCING APPARATUS.

Application filed April 4, 1924. Serial No. 704,150.

This invention relates to improved methods and apparatus for recording and reproducing motion picture scenes and accompanying spoken words or other sounds; and its object, generally, is the perfection of apparatus of this character and in the manner of operatively connecting the same so as to afford more realistic exhibitions than heretofore.

The defects hitherto in combined motion picture and sound apparatuses has been mainly due to the lack of provision to produce sound records which are capable of reproducing in association with screen pictures mobile sounds at positions corresponding with their positions of origin with respect to the field of the picture.

These defects and imperfections, and the manner in which the same are overcome will be explained in following description and particularly set forth in the claims.

The invention is illustrated in the accompanying drawings, in which,—

Figure 1:
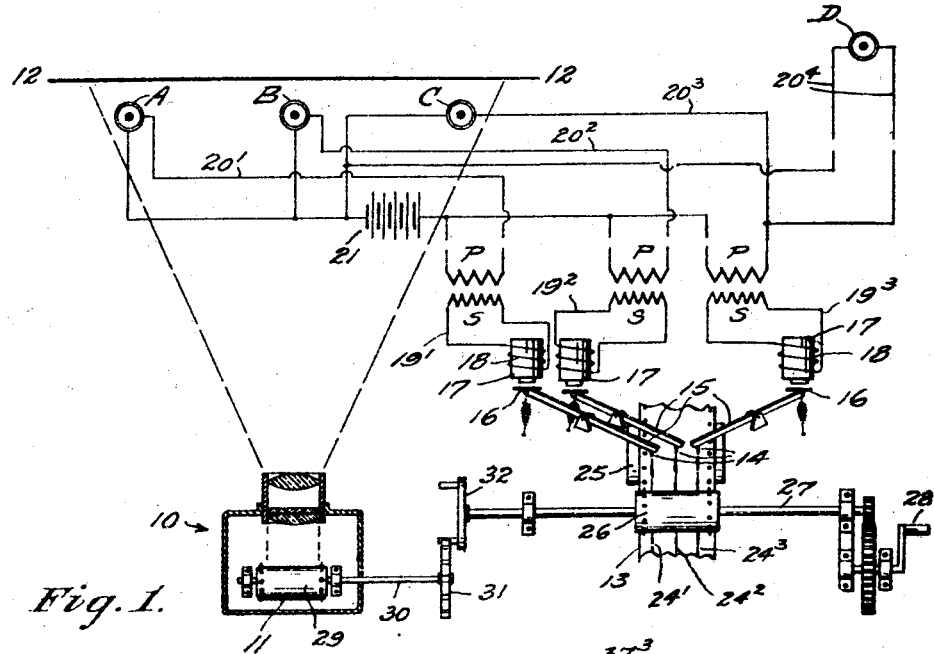
Figure 2:
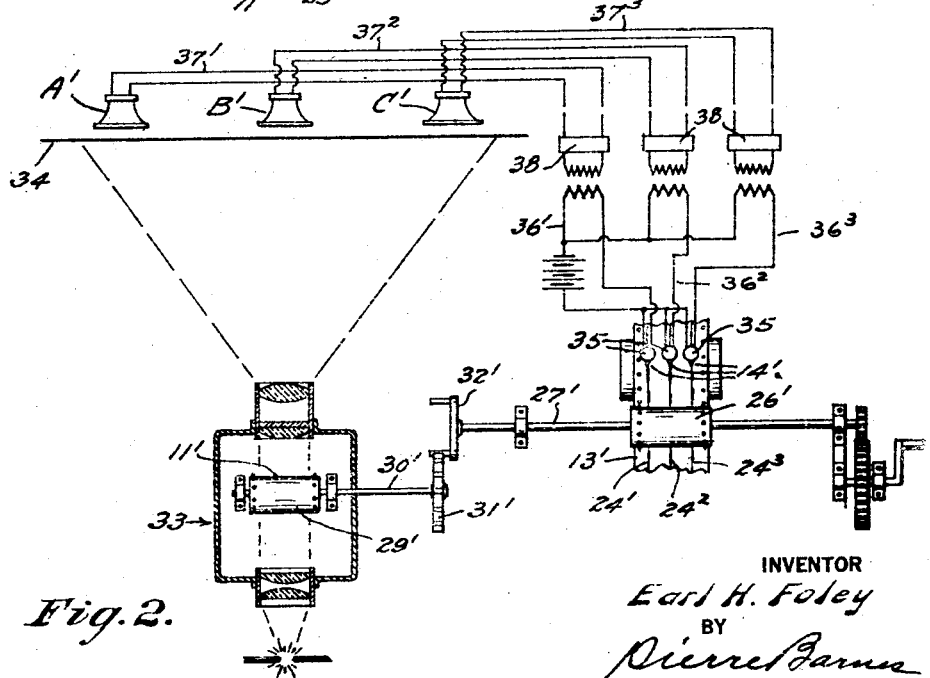
Figure 3:
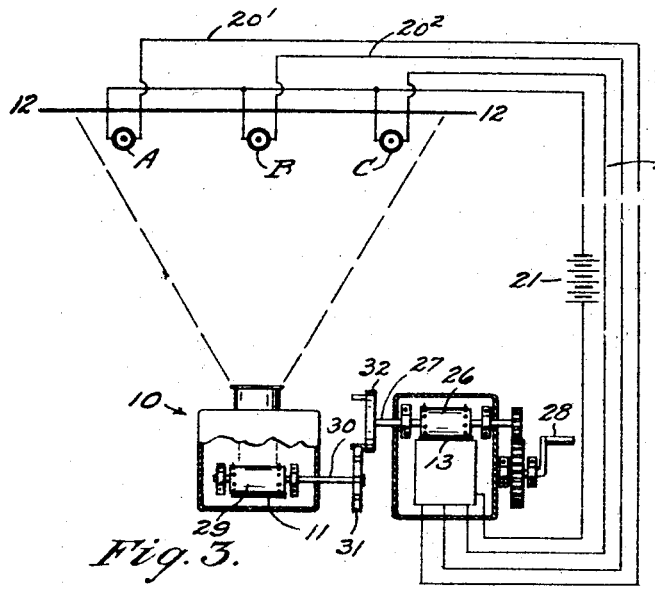
Figure 4:
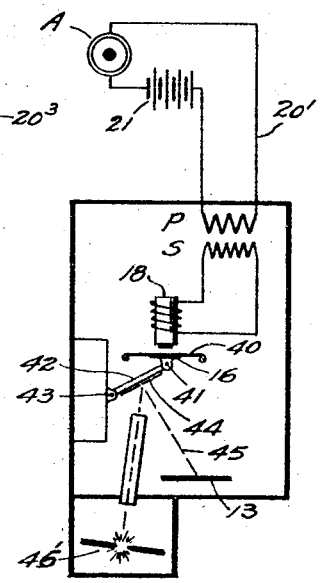
Figure 5:
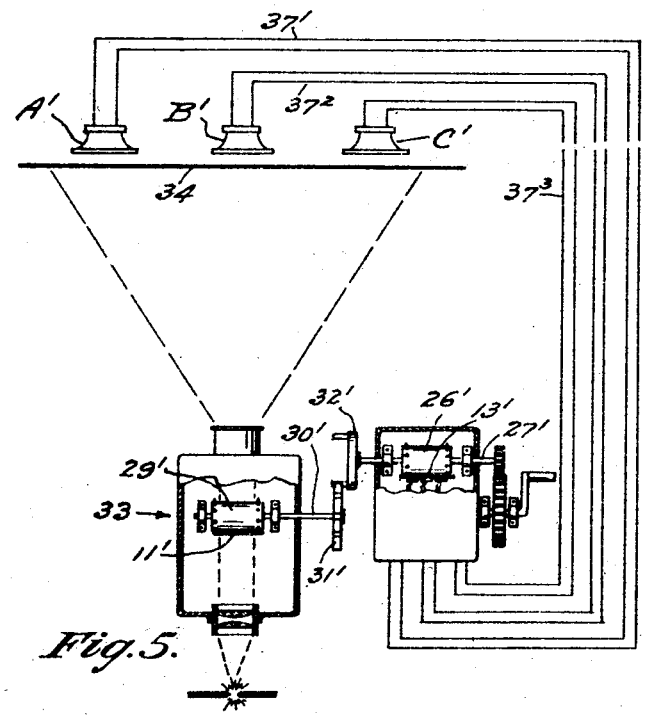
Figure 6:
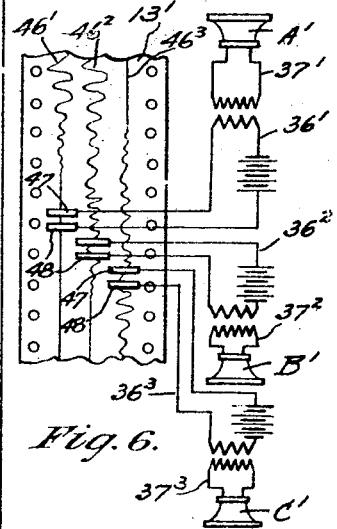

Figure 1 is a sectional plan view, shown somewhat diagrammatically, representing sound and picture producing apparatuses with relation to the scene and sound sources, the sound recording apparatus being of the frictional type. Fig. 2 is a similar view illustrating apparatus for projecting pictures upon a screen and apparatus for reproducing the sounds frictionally in their locations or places of origin with respect to the reproduced pictures. Fig. 3 is similar view illustrating an alternative form of the invention, wherein recording apparatuses are of the non-frictional type. Fig. 4 is a diagrammatic view of a known system of recording sound by a moving beam of light. Fig. 5 represents means for reproducing sound and picture exhibits recorded through the medium of apparatuses illustrated in Figs. 3 and 4. Fig. 6 is a plan view of a portion of a record strip of the character employed in the sound reproducer shown in Fig. 5 with associated reproducing circuits.

Figure 7:
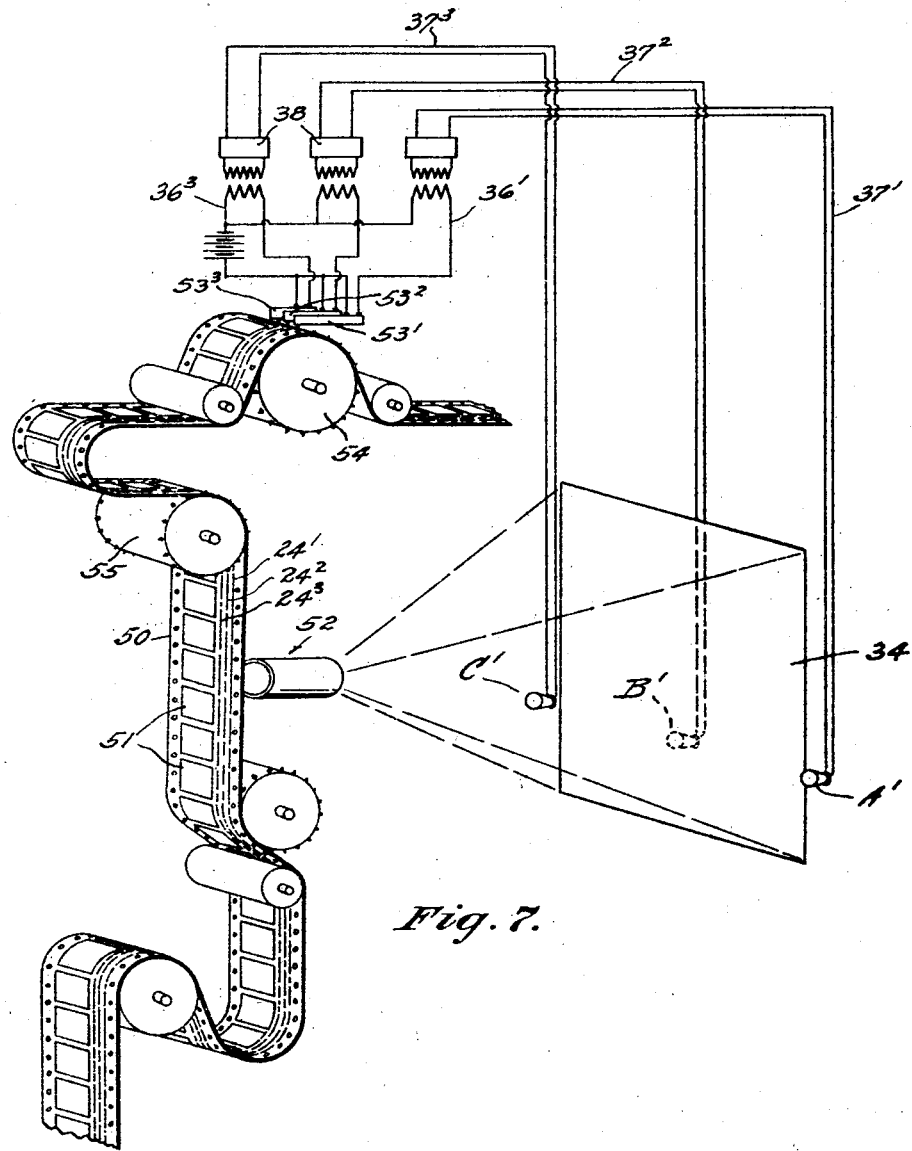

Fig. 7 is a view partly in perspective and partly diagrammatic employing apparatus similar to that illustrated in Fig. 2 except that a single film is utilized for both the sound and picture records, and showing the film operating mechanism more in detail.

Similar reference characters indicate corresponding parts in all of the views.

Referring to the drawings, the reference numeral 10 indicates a camera of known or suitable construction for producing upon an intermittently moving film 11 a succession of negative pictures of scenes occurring, say, in a field represented by line 12—12. Associated with said camera is a graphophone by which sound records are produced, as for example, upon a film 13 through the medium of a plurality of styluses 14 which, as shown in Fig. 1, are respectively connected to levers 15 carrying armatures 16 which are actuated by means of electric magnets 17.

The windings 18 of said magnets are in secondary circuits $19^1$, $19^2$ and $19^3$ which are energized through the instrumentality of inductances P and S from primary circuits $20^1$, $20^2$ and $20^3$ respectively. Said primary circuits include a battery 21 and microphones indicated by A, B, and C for the respective circuits.

According to the present invention said microphones are disposed in spaced relations with respect to each other and to different portions of the scene or field 12—12 which is to be recorded pictorially on the film.

Microphones disposed in spaced relations will be affected as to intensity of sound vibrations in direct proportion to the square of the amplitude of the vibrations of the source of sound, and inverse proportion to the square of the distance from the source of sound, that is to say—will vary individually as the source of sound impulses is nearer to or farther from the different microphones. Therefore a mobile source of sound will have a continually varying effect on the microphone per se.

As each of the microphones are in circuit with an individual recorder, the differences in the sound intensities acting on the various microphones will be correspondingly produced by the respective recorders.

D represents a supplementary microphone which may be located at any convenient place and, as shown, is connected by leads 20⁴ with the circuit 20³ although it may be connected and arranged to operate a stylus to produce an independent record on the film 13, if desired.

The purpose of the microphones A, B, and C and the associated styluses actuated therewith is to produce sound record identations as 24¹, 24² and 24³ on the film 13 according to positions with respect to the field whereat the sounds occur. The other microphone D, and its connections with the film recording stylus therefor is designed to afford a record of sounds for what may be termed stage of effects as, for example, a loud noise made upon a bass drum to indicate an exaggerated sound due to the impact of a falling body as represented in the scene.

As shown in Fig. 1, the film 13 is intended to travel unintermittently over a platen 25 by means of a spur roller 26 mounted upon a shaft 27 which is rotated as by means of an operating crank 28. Motion is transmitted intermittently to the picture film 11 by means of a spur roller 29 having a shaft 30 upon which is mounted a slot wheel 31 receiving motion from a pin gear 32 mounted upon the shaft 27.

In Fig. 2, is represented apparatuses for reproducing the records obtained by means of the above described devices, comprising a kinetoscope 33 adapted to project upon a screen 34 motion pictures from an intermittently driven film 11¹.

13¹ represents a graphophone film record of sounds corresponding to those accompanying the scene which is recorded on the picture film 11¹.

The films 13¹ and 11¹ respectively are driven by means of spur rollers 26¹ and 29¹ mounted upon shafts 27¹ and 30¹ whereby progressive motion of the shaft 27¹ is transmitted in the form of intermittent motion to the shaft 30¹ through the medium of a slot wheel 31¹ and a pin gear 32¹ on the respective shafts 30¹ and 27¹.

14¹ represent reproducing styluses associated with reproducers 35, preferably of the microphone type, one for each record line or groove 24¹, 24², 24³ on the film 13¹, said reproducers being influenced by the vibrations transmitted through the styluses by the undulating surface of the record sound waves.

These reproducers are included in primaries 36¹, 36² and 36³ of induction circuits whose secondaries 37¹, 37² and 37³, include electrical sound-amplifiers 38 and receivers A¹, B¹, and C¹ of a loud speaker type.

According to the present invention the receivers A¹, B¹ and C¹, respectively, are located in approximately the relative positions laterally and vertically of the screen 34. that the transmitting microphones occupy with respect to the field 12—12 of the scene which is being reproduced upon the screen.

By such devices it is apparent, with the exception of the repetition of the sounds transmitted by the supplementary microphone D (Fig. 1) from an extraneous source, that the sounds reproduced through the medium of the receivers A¹, B¹, C¹ will be distributed in accordance with and accompany the scene action in a most effective manner and proper locations.

In the alternative forms illustrated in Figs. 3 to 6, inclusive, the devices are similar to those shown in Figs. 1 and 2, except that the means provided in the graphophones for recording and reproducing sounds is by non-frictional means instead of by frictional means.

To which ends the sound waves record through the medium of the respective microphones A, B and C, Fig. 3, are recorded upon a strip of paper or other suitable material as by means of an oscillograph, an example of a single circuit system being illustrated in Fig. 4. In which view, the microphone A is in series with the battery 21 and the primary winding P of an induction coil, the secondary winding of which is in series with the winding of a magnet core 18 having its armature 16 applied to a resilient diaphragm 40. This diaphragm is connected at 41 to the free end of a lever 42 which is fulcrumed at 43 and carries a mirror 44 which reflects a light beam indicated by 45 from a source of light 45¹ in transverse current conducting lines upon the record strip 13 during the progressive travel of the latter.

In the present invention it is to be understood that the record is provided with a current conducting line or graph of sound for each of the sound transmitting microphones.

As shown in Fig. 6 the record 13¹ is provided with three sound wave lines 46¹, 46² and 46³ each of which being reproduced through the medium of a current conductor 47 of minimum resistance and a conductor 48 of high resistance substantially as illustrated and described in U. S. Patent No. 1,396,178 issued to me November 8, 1921. The associated current conductors above mentioned constitute the terminals of the respective primaries 36¹, 36² and 36³ which are electrically connected through the medium of induction coils or transformers with the secondary circuits 37¹, 37² and 37³ with the receivers or loud speakers A¹, B¹ and C¹.

In the hereinbefore specification I have described apparatus employing separate sound and picture films, but the invention also includes apparatus adapted to produce concurrently upon a single film both sound and picture records; and also apparatus whereby such combined record film is reproduced to effect the respective sound and picture exhibits.

To illustrate the application of the invention with respect to combined sound and picture film devices, reference is had to a reproducing apparatus shown in Fig. 7 the operation of which, it will be understood, is substantially similar to producing apparatus except that one acts reversely of the other.

In Fig. 7 is shown a film 50 upon which is provided a row of positive pictures denoted by 51 arranged to pass successively across the axis of a kinetoscope objective 52. Upon said film at one side of such row of pictures are provided sound record indentations denoted by $24^1$, $24^2$ and $24^3$ whereby reproducers as $53^1$, $53^2$ and $53^3$ are influenced to cause the associated receivers or loud speakers $A^1$, $B^1$ and $C^1$ to be actuated simultaneously with the projecting of the respective film pictures upon the screen 34.

In order to effect in proper sequence reproduction of both the sound and picture records, said sound reproducers are located, so as to be operated by the record indentations at a position where the film has a uniform motion such as afforded by the constantly rotating sprocket 54 and the objective 52 is located below the intermittently driven sprocket 55.

While I have illustrated and described specific embodiment of the invention it is to be understood that I do not confine myself thereto as changes may be made within the scope of the following claims.

What I claim is:—

1. The combination in apparatus for effecting synchronization and relative distribution of sounds with respect to sources in talking motion pictures, of a record body, multiple independent sound recording devices associated with the record body for recording thereon independent co-extensive records, the sound producing qualities of which are chronologically dependent upon the impulse at the source, said sound recording devices having a placement common with the source of sound to be recorded, photographic recording apparatus, and means for inducing chronological concurrency between the photographic record and the respective sound records.

2. The combination in apparatus for effecting synchronization and relative distribution of sounds with respect to sources in talking motion pictures, of a record body, multiple independent sound recording devices associated with the record body for recording thereon independent linearly co-extensive records, the sound producing qualities of which are chronologically dependent upon the impulse at the source, said sound recording devices having a placement common with the source to be recorded, a photographic record body, and means for inducing chronological concurrency between the photographic record body and the record body containing the sound records.

3. The combination in apparatus for effecting synchronization and relative distribution of sounds with respect to sources in talking motion pictures, of a plurality of movable tape record bodies, means for inducing chronological concurrency in the movement of said bodies, one of said bodies designed to receive thereon sound records, and the other body designed to receive thereon photographic representations, and multiple independent sound recording devices associated with the sound record body for recording thereon independent linearly co-extensive records, the sound producing qualities of which are chronologically dependent upon the impulse at the source, said sound recording devices having a placement common with the source to be recorded.

4. The combination in apparatus for effecting synchronization and relative distribution of sounds with respect to sources in talking motion pictures, means for receiving photographic representations and sound records, means for inducing chronological concurrency in said photographic representations and sound records, and multiple independent sound recording devices for producing independent linearly co-extensive records, the sound producing qualities of which are chronologically dependent upon the impulse at the source, said sound recording devices having a placement common with the source to be recorded.

5. The combination in apparatus for effecting synchronization and relative distribution of sounds with respect to sources in talking motion pictures, of a record body, said record body being provided thereon with independent linearly co-extensive sound records, the sound producing qualities of which are chronologically dependent upon the sequence of sound impulses, a photographic record body in chronological concurrency with the respective sound records, and relatively independent sound reproducing devices, one associated with each of said sound records, and each having a placement common with the photographic representation of the source.

Signed at Seattle, Washington, this 19th day of January, 1924.

EARL H. FOLEY.